A. Torrey.
Water Gate.

N° 6,751.    Patented Oct. 2, 1849.

UNITED STATES PATENT OFFICE.

AMBROSE TORREY, OF BOSTON, NEW YORK.

SELF-ACTING WASTE-GATE OR SLUICE.

Specification of Letters Patent No. 6,751, dated October 2, 1849.

*To all whom it may concern:*

Be it known that I, AMBROSE TORREY, of Boston, in the county of Erie and State of New York, have invented a new and Improved Waste-Gate for Discharging the Surplus Water from Mill-Ponds, Canals, Basins, and Reservoirs, and all Places where it May be Used Advantageously; and I do hereby declare that the following is a full and exact description.

The nature of my invention consists in providing a waste gate for mill ponds, canals, basins, reservoirs, and all places where it may be used advantageously, which turns on a horizontal axis and is opened and shut by the action of the water as it rises and falls.

To enable others skilled in the art to make and use my invention, I will proceed to describe its construction and operation, reference being had to the accompanying drawing, in which—

Figure 1:
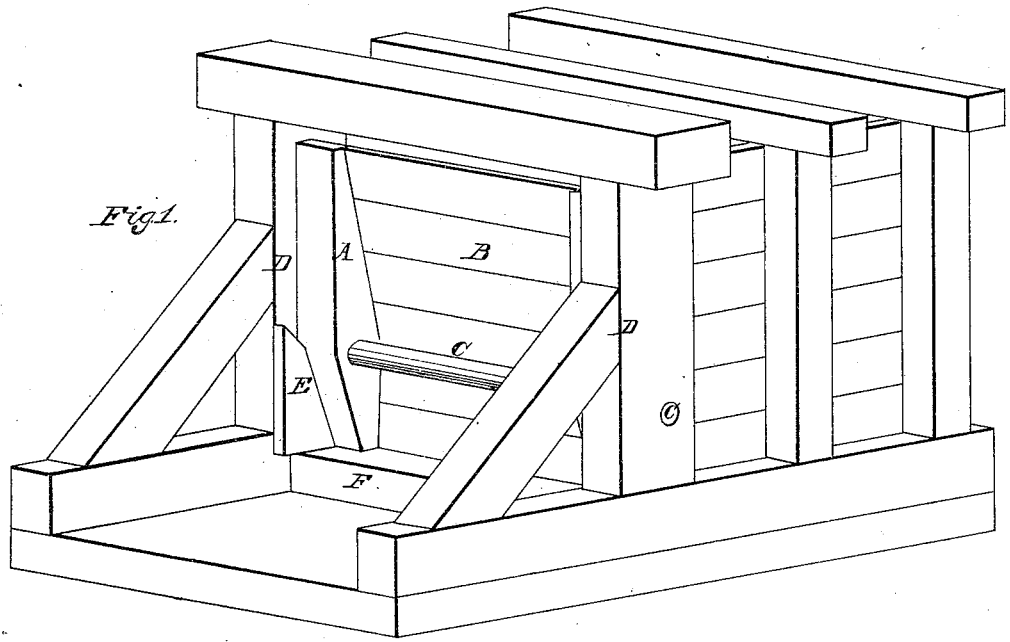
Figure 2:
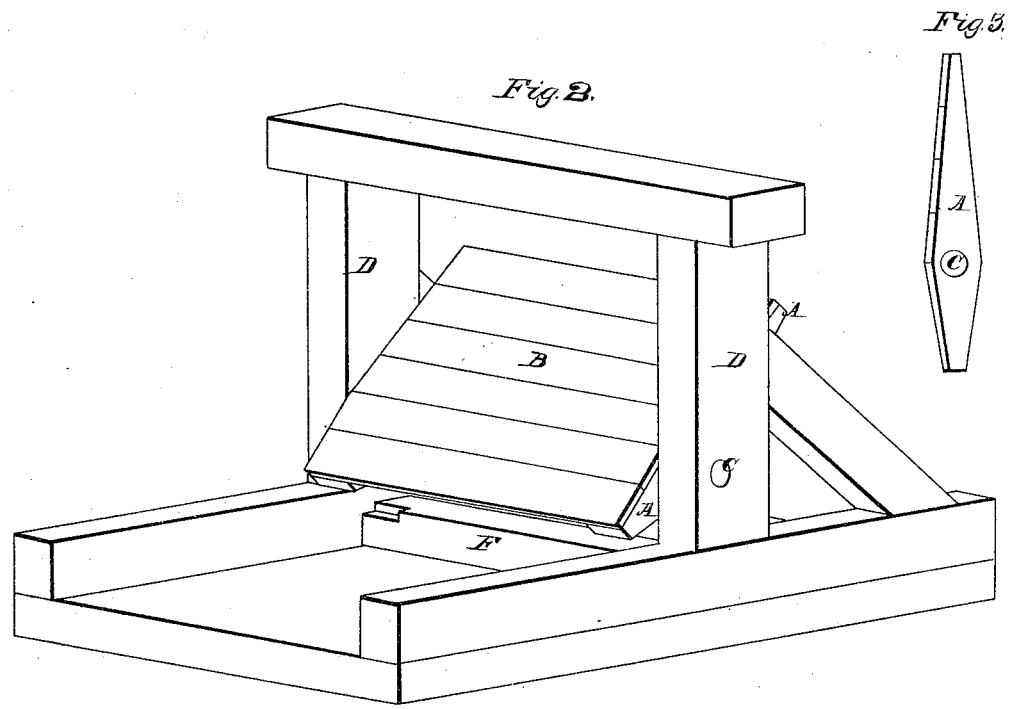
Figure 3:
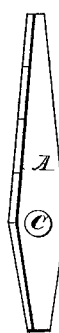

Figure 1 is a perspective view of the waste gate which is represented closed, in its proper position in an appropriate frame work or flume. Fig. 2 is a like view of the inside of the waste gate, which in this case is represented open, the sides of the flume being removed to give a better view of the gate. Fig. 3, is an end view of the gate, showing its form, and the position of the axis.

The side pieces or timbers on which the planks are laid to construct the gate, and through which the axis passes are so formed that there shall be sufficient thickness where they receive the axis to sustain the pressure of the water and then taper from that point to the ends which should be of sufficient thickness to sustain the plank, said timbers being represented by A, A, in the drawings.

The axis C, C, may be made of wood or iron though iron is recommended. It may be so constructed that the gate will turn on the axis or the axis in the posts which receive it.

When the gate B, is hung on its posts and closed that portion of it below the center of the axis should stand perpendicularly and the part above should slant back from the water at the rate of about three inches to a foot in height. There should be a timber F, of sufficient capacity laid across and secured nearly under the gate so constructed as to receive the ends of the side pieces A, A, and against which the plank portion of the gate will fit in a proper manner to secure it and prevent the escape of the water. The posts D, D, in which the gate is hung should be securely braced on the outside, or otherwise secured and pieces of plank E, pinned to them so constructed that the parts of the side pieces A, A, below the axis shall rest against them when the gate is shut, and slant up from the axis so that when the gate opens they will serve as stops to arrest its motion at the proper point.

The gate being thus constructed and the water rising to the top of the gate it will open over with the current, the upper part with, and the bottom against it the top falling down about half the way to a horizontal position where its motion is arrested by the stops E, above described; the gate being thus opened the water will flow over and under it until the water falls a little below the top of the gate, when the action of the water on the lower part of the gate causes it to shut.

What I claim as my invention and desire to secure by Letters Patent is—

A water gate which revolves on a horizontal axis placed nearer the bottom than the top of the gate, which is opened and shut by the action of the water and whose motion is restricted by appropriate stops, the whole constructed and operating substantially as herein described.

AMBROSE TORREY.

Witnesses:
SYDENHAM S. CLARK,
HORACE BOIES.